(12) United States Patent
Arimura (10) Patent No.: US 7,582,376 B2
(45) Date of Patent: Sep. 1, 2009

(54) PROTON CONDUCTIVE POLYMER AND FUEL CELL USING THE SAME

(75) Inventor: Tomoaki Arimura, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 721 days.

(21) Appl. No.: 11/226,840

(22) Filed: Sep. 14, 2005

(65) Prior Publication Data

US 2006/0068256 A1    Mar. 30, 2006

(30) Foreign Application Priority Data

Sep. 29, 2004    (JP) .................. P.2004-285467

(51) Int. Cl.
  H01M 8/00    (2006.01)
  H01M 8/10    (2006.01)
  B32B 3/00    (2006.01)

(52) U.S. Cl. .................. 429/33; 429/12; 429/30; 428/314.8

(58) Field of Classification Search .............. 429/12, 429/30, 33; 428/314.8
  See application file for complete search history.

(56) References Cited

U.S. PATENT DOCUMENTS

| | | | |
|---|---|---|---|
| 2,762,711 | A | 9/1956 | Zopf, Jr. |
| 3,658,591 | A | 4/1972 | Fukuda et al. |
| 3,736,540 | A | 5/1973 | Westphal |
| 3,759,261 | A | 9/1973 | Wang |
| 4,466,868 | A * | 8/1984 | Gray .................. 205/503 |
| 4,629,664 | A | 12/1986 | Tsukui et al. |
| 4,705,513 | A | 11/1987 | Sheldon et al. |
| 4,948,683 | A | 8/1990 | Picozzi et al. |
| 5,200,278 | A | 4/1993 | Watkins et al. |
| 5,709,737 | A | 1/1998 | Malhotra et al. |
| 5,714,874 | A | 2/1998 | Bonnefoy |
| 6,183,914 | B1 | 2/2001 | Yao et al. |
| 6,475,655 | B1 | 11/2002 | Nakanishi et al. |
| 6,653,005 | B1 | 11/2003 | Muradov |
| 6,663,990 | B2 | 12/2003 | Lio et al. |
| 6,670,063 | B1 | 12/2003 | Aoyagi et al. |
| 6,686,081 | B2 | 2/2004 | Gottesfeld |
| 6,808,837 | B2 | 10/2004 | Hirsch |
| 6,835,495 | B2 * | 12/2004 | Michot et al. .................. 429/188 |
| 7,104,114 | B2 | 9/2006 | Hisano et al. |
| 2002/0037447 | A1 | 3/2002 | Imaseki et al. |
| 2002/0108740 | A1 | 8/2002 | Hidaka et al. |
| 2003/0049367 | A1 | 3/2003 | Biegert et al. |
| 2003/0124398 | A1 | 7/2003 | Rabinovich et al. |
| 2003/0196913 | A1 | 10/2003 | Xie et al. |
| 2004/0009389 | A1 | 1/2004 | Sakai et al. |
| 2004/0013912 | A1 | 1/2004 | Preidel |
| 2004/0023094 | A1 | 2/2004 | Hatayama et al. |
| 2004/0048132 | A1 | 3/2004 | Takai et al. |
| 2004/0072051 | A1 | 4/2004 | Murata et al. |
| 2004/0161642 | A1 | 8/2004 | Hisano et al. |
| 2004/0166389 | A1 | 8/2004 | Matsuoka et al. |
| 2004/0166393 | A1 | 8/2004 | Akita et al. |

(Continued)

FOREIGN PATENT DOCUMENTS

EP    1625 634    6/2005

(Continued)

OTHER PUBLICATIONS

"Material Safety Data Sheet", *Methanex Corporation*, (Oct. 13, 2005), pp. 1-7.

*Primary Examiner*—Dah-Wei D Yuan
*Assistant Examiner*—Zachary Best
(74) *Attorney, Agent, or Firm*—Blakely, Sokoloff, Taylor & Zafman LLP (57) ABSTRACT

A proton conductive polymer comprising: a methanol exclusive compound unit; and a proton conductive compound unit.

17 Claims, 2 Drawing Sheets

U.S. PATENT DOCUMENTS

| | | |
|---|---|---|
| 2004/0170886 A1 | 9/2004 | Sakamoto |
| 2004/0197919 A1 | 10/2004 | Herman et al. |
| 2004/0232206 A1 | 11/2004 | Hidaka et al. |
| 2005/0042493 A1 | 2/2005 | Fujita et al. |
| 2005/0058858 A1 | 3/2005 | Fujita et al. |
| 2005/0069742 A1 | 3/2005 | Tomioka et al. |
| 2005/0130009 A1 | 6/2005 | Hasegawa et al. |
| 2005/0266280 A1 | 12/2005 | Ozeki et al. |
| 2006/0014069 A1 | 1/2006 | Kaye et al. |
| 2006/0068255 A1 | 3/2006 | Arimura |
| 2006/0068256 A1 | 3/2006 | Arimura |
| 2006/0078767 A1 | 4/2006 | Arimura |
| 2006/0105208 A1 | 5/2006 | Sebori et al. |
| 2006/0112613 A1 | 6/2006 | Arimura |
| 2006/0115704 A1 | 6/2006 | Arimura |
| 2006/0141296 A1 | 6/2006 | Arimura |
| 2006/0141297 A1 | 6/2006 | Arimura |
| 2006/0172163 A1 | 8/2006 | Suh et al. |
| 2006/0177709 A1 | 8/2006 | Nagasaki |
| 2006/0177710 A1 | 8/2006 | Tajima et al. |
| 2006/0177712 A1 | 8/2006 | Hirayama |
| 2006/0177713 A1 | 8/2006 | Tajima et al. |
| 2006/0177724 A1 | 8/2006 | Tajima et al. |
| 2006/0188759 A1 | 8/2006 | Hisano |
| 2006/0228599 A1 | 10/2006 | Takaiwa |
| 2006/0228600 A1 | 10/2006 | Ozeki et al. |
| 2006/0237460 A1 | 10/2006 | Kang et al. |
| 2006/0269803 A1 | 11/2006 | Bofinger et al. |
| 2006/0292420 A1 | 12/2006 | Goto et al. |
| 2006/0292421 A1 | 12/2006 | Hirayama |
| 2006/0292423 A1 | 12/2006 | Nagasaki |
| 2007/0048567 A1 | 3/2007 | Hisano et al. |
| 2007/0122670 A1 | 5/2007 | Goto |
| 2007/0202384 A1 | 8/2007 | Watanabe et al. |
| 2007/0231645 A1 | 10/2007 | Nagasaki |
| 2007/0264559 A1 | 11/2007 | Chang et al. |
| 2007/0281189 A1 | 12/2007 | Watanabe et al. |
| 2007/0281191 A1 | 12/2007 | Goto |
| 2008/0026264 A1 | 1/2008 | Watanabe |
| 2008/0063913 A1 | 3/2008 | Hirayama |

FOREIGN PATENT DOCUMENTS

| | | | |
|---|---|---|---|
| JP | 02-183968 | | 7/1990 |
| JP | 03-108267 | | 5/1991 |
| JP | 03-215734 | | 9/1991 |
| JP | 04-229957 | | 8/1992 |
| JP | 05-182675 | | 7/1993 |
| JP | 06-243882 | | 9/1994 |
| JP | 06-251790 | | 9/1994 |
| JP | 06-267577 | | 9/1994 |
| JP | 07-135007 | | 5/1995 |
| JP | 07-307161 | | 11/1995 |
| JP | 08-264199 | | 10/1996 |
| JP | 09-110771 | | 4/1997 |
| JP | 11-230813 | | 8/1999 |
| JP | 2000-044840 | | 2/2000 |
| JP | 2000-331703 | | 11/2000 |
| JP | 2001-283634 | | 10/2001 |
| JP | 2001283634 A | * | 10/2001 |
| JP | 2002-151126 | | 5/2002 |
| JP | 2002-184435 | | 6/2002 |
| JP | 2002-287441 | | 10/2002 |
| JP | 2002-373688 | | 12/2002 |
| JP | 2003-217637 | | 7/2003 |
| JP | 2003-223244 | | 8/2003 |
| JP | 2003-235737 | | 12/2003 |
| JP | 2004-006335 | | 1/2004 |
| JP | 2004-039341 | | 2/2004 |
| JP | 2004-044600 | | 2/2004 |
| JP | 2004-047400 | | 2/2004 |
| JP | 2004-087159 | | 3/2004 |
| JP | 2004-095376 | | 3/2004 |
| JP | 2004-127618 | | 4/2004 |
| JP | 2004-127659 | | 4/2004 |
| JP | 2004-127672 | | 4/2004 |
| JP | 2004-127905 | | 4/2004 |
| JP | 2004-146179 | | 5/2004 |
| JP | 2004-146274 | | 5/2004 |
| JP | 2004-171813 | | 6/2004 |
| JP | 2004164971 | | 6/2004 |
| JP | 2004-185904 | | 7/2004 |
| JP | 2004-213975 | | 7/2004 |
| JP | 2004-234947 | | 8/2004 |
| JP | 2004-241169 | | 8/2004 |
| JP | 2004-247217 | | 9/2004 |
| JP | 2004-265787 | | 9/2004 |
| JP | 2004-288574 | | 10/2004 |
| JP | 2004-311436 | | 11/2004 |
| JP | 2005-011635 | | 1/2005 |
| JP | 2005-011691 | | 1/2005 |
| JP | 2005-032585 | | 2/2005 |
| JP | 2005-056764 | | 3/2005 |
| JP | 2005-108718 | | 4/2005 |
| JP | 2005-123110 | | 5/2005 |
| JP | 2005-129469 | | 5/2005 |
| JP | 2005-150025 | | 6/2005 |
| JP | 2005-267898 | | 9/2005 |
| JP | 2005-276588 | | 10/2005 |
| JP | 2005-293981 | | 10/2005 |
| JP | 2006-032209 | | 2/2006 |
| JP | 2006-040787 | | 2/2006 |
| JP | 2006-066342 | | 3/2006 |
| JP | 2006-073486 | | 3/2006 |
| JP | 2006-085971 | | 3/2006 |
| JP | 2006-286321 | | 10/2006 |

* cited by examiner

PROTON CONDUCTIVE POLYMER AND FUEL CELL USING THE SAME

CROSS-REFERENCE TO RELATED APPLICAION

This application is based upon and claims the benefit of priority from the prior Japanese Patent Application No. 2004-285467, filed on Sep. 29, 2004; the entire content of which are incorporated herein by reference.

BACKGROUND

1. Field

Embodiments of the invention relates to a proton conductive polymer which can be preferably used in fuel cell and alkaline electrolysis industry and a fuel cell comprising an electrolyte membrane containing the proton conductive polymer.

2. Description of the Related Art

A fuel cell performs electrochemical reaction of hydrogen with oxygen to generate electricity and thus has been noted as a clean electricity-generating device. As such a fuel cell there has been heretofore known a solid polymer electrolyte type fuel cell that uses hydrogen gas as a fuel. The solid polymer electrolyte membrane to be used in this solid polymer electrolyte type fuel cell is disclosed in, e.g., JP-A-2002-110174 and JP-A-2003-36864.

JP-A-2002-110174 discloses that a solid polymer electrolyte membrane made of an aromatic hydrocarbon-based polymer compound containing a sulfoalkyl group in its side chains exhibits an enhanced durability that improves the output characteristics of solid polymer electrolyte type fuel cell. On the other hand, JP-A-2003-36864 discloses a solid polymer electrolyte membrane composed of a main chain formed by a copolymer of fluorocarbon-based vinyl monomer with hydrocarbon-based vinyl monomer and a hydrocarbon-based side chain having a sulfonic acid group wherein the hydrocarbon-based side chain has α-methylstyrene group incorporated therein, thereby inhibiting the oxidative deterioration of solid polymer electrolyte membrane.

A direct methanol type fuel cell (DMFC) that operates by supplying methanol into the anode thereof while being left unreformed has been under study. This direct methanol type fuel cell requires no reformer and thus can be drastically reduced in its weight and compacted. Therefore, the direct methanol type fuel cell has been expected as a portable fuel cell.

As the proton conductive membrane to be incorporated in such a direct methanol type fuel cell there has been widely used a perfluorosulfonic acid polymer membrane as disclosed in JP-A-2002-313366. However, this perfluorosulfonic acid polymer membrane undergoes a great methanol crossover phenomenon. Further, this perfluorosulfonic acid polymer membrane leaves something to be desired in protonic conductivity. Accordingly, membrane-electrode assemblies (MEA) formed by this perfluorosulfonic acid polymer membrane cannot provide a sufficient electricity-generating efficiency.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION

The inventors made extensive studies. As a result, it was found that the provision of a proton conductive polymer comprising a methanol exclusive compound unit and a proton conductive compound unit makes it possible to attain both the inhibition of permeation of methanol and the enhancement of protonic conductivity. The invention has thus been worked out. (In this specification, a methanol exclusive compound unit means a compound unit that has an effect of excluding methanol.)

In other words, a proton conductive polymer comprising an aromatic steric compound unit and a proton conductive compound unit exhibits a lower affinity for methanol than perfluoroalkylsulfonic acid and thus can inhibit the permeation of methanol therethrough. Further, this proton conductive polymer can exhibit an enhanced protonic conductivity as compared with perfluoroalkylsulfonic acid. Moreover, despite being non-fluorine-based, this polymer can difficultly undergo oxidative degradation and thermal decomposition and is excellent in chemical stability.

Accordingly, the fuel cell comprising an electrolyte membrane containing this proton conductive polymer can exhibit an enhanced reaction efficiency of membrane-electrode assembly (MEA) as compared with fuel cells comprising a perfluoroalkylsulfonic acid-based membrane.

The proton conductive polymer will be further described hereinafter.

The proton conductive polymer preferably has a repeating unit represented by formula (1):

Formula (1)

wherein X represents an aromatic steric compound unit; Y represents a proton conductive compound unit; and P, Q and R each independently represents a positive integer.

(Aromatic Steric Compound Unit)

The aromatic steric compound unit preferably comprises as a basic skeleton a structure having an aromatic ring and an aliphatic cyclic compound chemically bonded to each other with one carbon as a central atom. This makes it possible to enhance the effect of inhibiting the permeation of methanol. The structure having an aromatic ring and an aliphatic cyclic compound chemically bonded to each other with one carbon as a central atom is preferably a spiro structure.

(Proton Conductive Compound Unit)

The proton conductive compound unit is preferably formed by an aromatic compound having a proton conductive functional group connected thereto. This proton conductive functional group is preferably a sulfonic acid group. In this arrangement, a high protonic conductivity can be realized.

Preferred among the repeating units represented by the foregoing formula (1) is one represented by formula (2):

Formula (2)

wherein $R^1$, $R^2$, $R^3$ and $R^4$ may be the same or different and each independently represents a $C_1$-$C_{10}$ substituent; and P, Q and M each independently represents a positive integer.

The proton conductive polymer having a repeating unit represented by the foregoing formula (2) exhibits a low affinity for methanol and a high ion exchange group density and thus can satisfy requirements for both inhibition of permeation of methanol and enhancement of protonic conductivity. Further, despite being non-fluorine-based, this polymer is excellent in chemical stability.

The reason for the limitation of the number of carbon atoms in the substituents $R^1$, $R^2$, $R^3$ and $R^4$ to the above defined range is that when the number of carbon atoms in the substituents $R^1$, $R^2$, $R^3$ and $R^4$ increases, rigidity, which is one of polymer properties, rises, making it difficult to form a membrane by a casting method or melting method and making it likely that the tensile strength of the resulting polymer can be lowered.

In order to exert a sufficient effect of inhibiting the permeation of methanol, the substituents $R^1$, $R^2$, $R^3$ and $R^4$ each are preferably a $C_1$-$C_{10}$ hydrocarbon group, carboxyl group or $C_1$-$C_{10}$ ether group.

In the polymer having a structure represented by the aforementioned formula (1) or (2), P is preferably from 1 to 200, Q is preferably from 1 to 200 and M is preferably from 80 to 30,000. In this arrangement, a proton conductive membrane having a low methanol permeability and an excellent protonic conductivity, chemical stability and mechanical strength can be realized. P and Q each are more preferably from 20 to 120. M is more preferably from 3,000 to 25,000. The proton conductive polymer of the invention is not limited to a specific type of copolymerization, but preferably a random copolymer.

Preferred examples of the use of proton conductive polymer include electrolyte membrane for fuel cell, electrode for fuel cell, and alkaline electrolysis industry. An example of the fuel cell is a direct methanol type fuel cell. A direct methanol type fuel cell comprises an anode containing an anode catalyst layer, a cathode containing a cathode catalyst layer and a solid electrolyte membrane disposed between the anode and the cathode. As a liquid fuel to be supplied into the anode there is used one containing methanol. On the other hand, as an oxidizing agent to be supplied into the cathode there is used air. This direct methanol type fuel cell is diagrammatically shown in FIG. 1.

Figure 1:
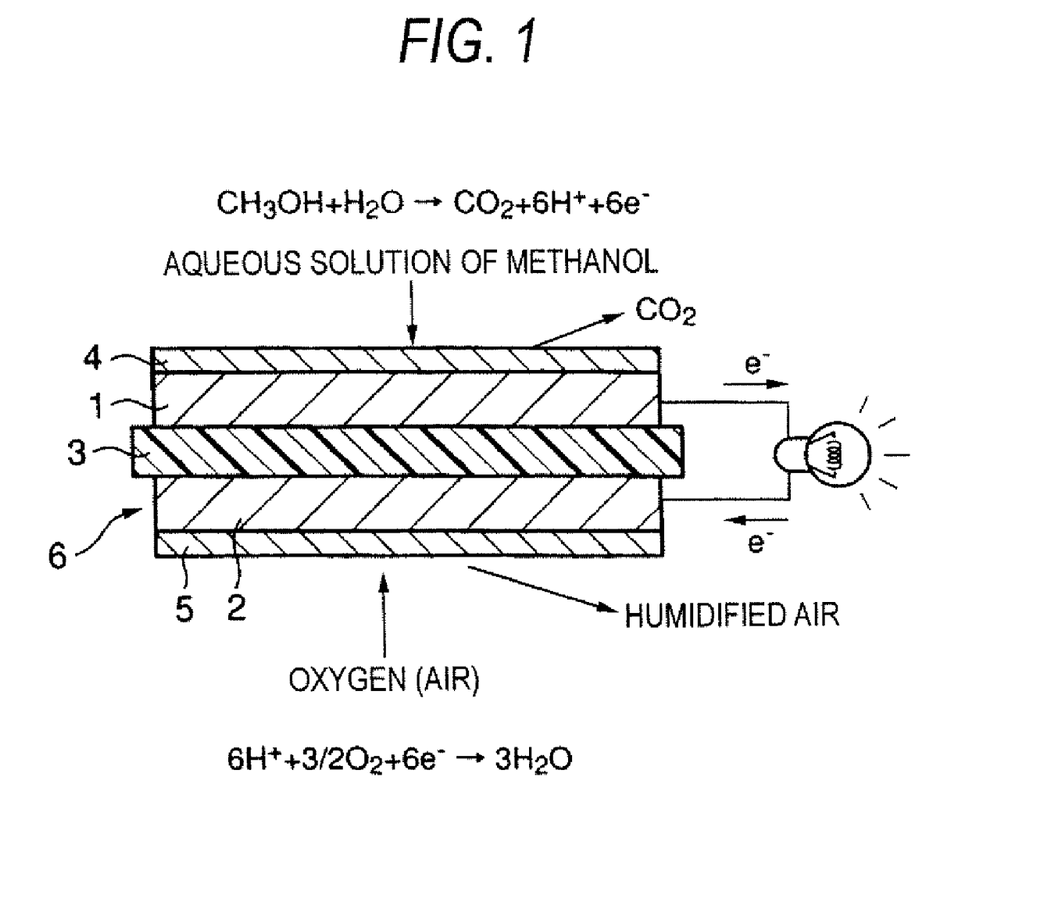
FIG. 1 is an exemplary diagrammatic view illustrating a direct methanol type fuel cell which is an embodiment of the fuel cell according to the invention.

The direct methanol type fuel cell comprises an anode catalyst layer 1, a cathode catalyst layer 2, a solid electrolyte membrane 3 disposed between the anode catalyst layer 1 and the cathode catalyst layer 2, an anode diffusion layer 4 disposed on the surface of the anode catalyst layer 1 opposite to the solid electrolyte membrane 3, and a cathode diffusion layer 5 disposed on the surface of the cathode catalyst layer 2 opposite the solid electrolyte membrane 3. The laminate of the five layers is generally called membrane-electrode assembly (MEA) 6.

Examples of the anode catalyst to be incorporated in the anode catalyst layer 1 include platinum alloys such as Pt—Ru alloy. On the other hand, examples of the cathode catalyst to be incorporated in the cathode catalyst layer 2 include Pt. The anode diffusion layer 4 is adapted to diffuse the liquid fuel uniformly in the anode catalyst layer 1 and is formed by, e.g., carbon paper. The cathode diffusion layer 5 is adapted to diffuse the oxidizing agent uniformly in the cathode catalyst layer 2 and is formed by, e.g., carbon paper. As the solid electrolyte membrane 3 there is used an electrolyte membrane containing the proton conductive polymer.

A liquid fuel composed of, e.g., aqueous solution of methanol is supplied into the anode catalyst layer 1 through the anode diffusion layer 4. An oxidizing agent such as air is supplied into the cathode catalyst layer 2 through the cathode diffusion layer 5. In the anode catalyst layer 1, a reaction represented by the following reaction formula (1) occurs.

$$CH_3OH+H_2O \rightarrow CO_2+6H^++6e^- \quad (1)$$

The proton thus produced is supplied into the cathode catalyst layer 2 through the solid electrolyte membrane 3. On the other hand, the electron is supplied into the cathode catalyst layer 2 through an external circuit. In this manner, a reaction represented by the following reaction formula (2), i.e., electricity-generating reaction occurs in the cathode catalyst layer 2.

$$6H^++3/2O_2+6e^- \rightarrow 3H_2O \quad (2)$$

Carbon dioxide and water produced by the foregoing electricity-generating reaction are discharged to the exterior. The excessive methanol which has not been consumed in the anode catalyst layer 1 can be recovered and reused as a fuel.

In accordance with a fuel cell having such a configuration, the occurrence of methanol crossover can be inhibited, the protonic conductivity of the electrolyte membrane can be enhanced and the deterioration of the electrolyte membrane caused by the repetition of electricity-generating reaction can be inhibited, making it possible to enhance the electricity generating efficiency of MEA.

EXAMPLE

Examples of the invention will be described in detail in connection with the attached drawings.

Example 1

<Polymerization Reaction>

The air in a glove box was replaced by an argon gas atmosphere. In this glove box, a teflon (trade name) agitating element was put in a 100 ml two-necked round flask. In this flask, 1.5 g ($3.5 \times 10^{-3}$ mol) of 3,3,3',3'-tetramethyl-1,1'-spirobisindane-5,5',6,6'-tetrol (molecular weight: 430) was then dissolved in 20 ml of tetrachloroethylene. The solution was then stirred by a magnetic stirrer. 0.11 g of metallic sodium was then put in the solution. The mixture was then stirred at room temperature for 1 hour to obtain a sodium alcoxide. To the sodium alcoxide thus obtained was then added 0.87 g ($3.5 \times 10^{-3}$ mol) of 2,7-dichloro-9-fluorenone (molecular weight: 249). The mixture was then stirred at 200 rpm for 4 hours. The reaction vessel was then withdrawn from the glove box. The contents of the reaction vessel were poured into 100 ml of water. The precipitate thus produced was put in two 100 ml centrifuge tubes which were then subjected to centrifugal separation at 3,000 rpm for 10 minutes. The resulting supernatant liquid was then discarded. To the residue was then added 50 ml of water. The mixture was then subjected to centrifugal separation. This procedure was repeatedly effected three times. The product was subjected to centrifugal separation with 50 ml of acetone, air-dried, and then vacuum-dried to obtain a polymer compound.

<Sulfonation Reaction>

A 100 ml two-necked round flask was equipped with a Liebig condenser, an agitator, a magnetic stirrer and an ice bath. Into the flask was charged the polymer previously obtained and then 20 ml of pyridine. Subsequently, the contents of the flask were stirred at 100 rpm for 15 minutes. Into the flask was then charged 2 ml of fuming sulfuric acid using a graduated cylinder. The contents of the flask were then stirred at 200 rpm using a magnetic stirrer for 2 hours. The contents of the flask were then pipetted into 100 ml of water. The resulting precipitate was put into two 100 ml centrifuge tubes which were then subjected to centrifugal separation at 3,000 rpm for 20 minutes. Thereafter, the resulting supernatant liquid was discarded. To the residue in the centrifuge tubes were each added 50 ml of water. The residue was then subjected to centrifugal separation in the same manner as mentioned above. This procedure was repeatedly effected three times. Finally, the reaction product was subjected to centrifugal separation with 50 ml of acetone, and then air-dried.

<Preparation of Cast Film>

The resin thus obtained was dissolved in 30 ml of N,N-dimethylformamide, stretched over a glass sheet using a bar coater, air-dried, and then vacuum-dried for 4 hours to obtain a cast film which is a proton conductive membrane. The cast film thus obtained was peeled off the glass sheet with a forceps, and then dipped and stored in 0.02 mol/l of hydrochloric acid.

The repeating unit contained in the proton conductive membrane of Example 1 is 3,3,3',3'-tetramethyl-1,1'-spiroindane-6,6'-diol-9-fluorenone sulfonic acid. The structure of the repeating unit is represented by formula (3):

Formula (3)

Comparative Example

As a proton conductive membrane there was prepared a perfluoroalkylsulfonic acid type membrane (Nafion 112: trade name of a perfluoroalkylsulfonic acid type membrane produced by DuPont Inc.).

<Measurement of Methanol Crossover>

Two cylinders having an inner diameter of 4 cm and a length of 5 cm were each closed at an end to prepare two glass tubes each having a groove with a width of 2 cm at the opening thereof and a hole with an inner diameter of 6 mm in the main body thereof. The comparative proton conductive membrane was provided between the two glass tubes. One of the two tanks was referred to as "tank A" while the other was referred to as "tank B". The tank A was filled with a 3 wt % aqueous solution of methanol and the hole having an inner diameter of 6 mm was filled with a silicon rubber. The hole in the tank B, too, was filled with a silicon rubber which was then pierced with a needle to which a rubber balloon was attached. When the tanks A and B were brought into contact with each other, measurement was then started. Every 20 minutes, the rubber plug of the tank B was pierced with a microsyringe to sample 20 microliter of the inner gas which was then subjected to gas chromatography to determine the concentration (ppm) of methanol. The time (minute) was plotted as abscissa while the methanol concentration (ppm) was plotted as ordinate. The value obtained by dividing the methanol concentration measured 100 minutes after starting by the time was defined to be methanol diffusion rate D0 (ppm/min).

The same measurement as mentioned above was conducted also on the proton conductive membrane of Example 1. The diffusion rate thus determined was defined to be D1. The methanol crossover inhibition ratio was then calculated by determining D0/D1. The results are set forth in Table 1 below.

<Measurement of Protonic Conductivity>

The following procedure was followed to prepare an electrical conductivity measuring cell.

(A) A cell for the preparation of a platinum electrode was prepared. Two sheets of teflon (trade name) plates (3.5 cm long×4.5 cm wide×1.0 cm high) each having a liquid reservoir (0.5 cm long×1.0 cm wide×1.0 cm deep) extending through the central portion thereof were prepared. A platinum foil (thickness: 0.30 mm) which was an electrode was cut into a size of 0.5 cm×2.0 cm which was then stuck to the teflon plate (trade name) with a both-sided tape in such an arrangement that the 0.5 cm side of the liquid reservoir and the 0.5 cm side of the platinum foil fall accurately on each other. A protective tape was stuck to the electrode at a point of 0.7 cm from the end of the liquid reservoir side thereof to adjust such that the electrode area was 0.35 $cm^2$.

(B) Subsequently, the electrode was plated with platinum black. In order to increase the surface area of the platinum electrode, the surface of the platinum electrode was plated with platinum black. In some detail, 0.008 g of lead acetate (Pb(CH$_3$COO)$_2$.3H$_2$O) and 1 g of chloroplatinic acid (H$_2$PtCl$_6$.6H$_2$O) were dissolved in 30 ml of a 1/40 N hydrochloric acid to prepare a plating solution. One sheet of the teflon plate (trade name) with platinum electrode prepared at the aforementioned step (A) was dipped one-by-one in the plating solution thus prepared. A DC voltage/current generator (R1644, produced by ADVANTEST CORPORATION) was set such that the bath voltage, current and current density were 3.0 V, 14 mA and 40 mA/cm$^2$, respectively. In order to alternately plate the two electrodes little by little, the positive side (+) and the negative side (−) of the electrode were exchanged with other by switching between the positive side (+) and negative side (−) of the device every about 1 minute. This procedure continued for 50 minutes. Thereafter, the two electrodes were each washed with distilled water. A voltage of 3 V was then applied to the electrodes in a 10 wt % diluted sulfuric acid with the platinum black electrode as negative pole (−) and the other fresh platinum electrode as positive pole (+) for 3 minutes to remove the plating solution and adsorbed chlorine. Finally, the electrodes were thoroughly washed with distilled water, and then stored in distilled water.

(C) Subsequently, the proton conductive membranes were measured for electrical conductivity by AC method (Cole-Cole plot). The comparative proton conductive membrane was cut into the size large enough to cover the liquid reservoir and the platinum black electrode of the cells prepared at the aforementioned steps A and B, i.e., 15 mm×12 mm, which was then provided between two sheets of teflon (trade name) plate. Subsequently, the liquid reservoir on the both sides of the proton conductive membrane were each filled with about 0.3 ml of a 0.03 N hydrochloric acid so that hydrochloric acid covers the entire electrically-conductive membrane from both sides thereof. The cell was fixed to a stand. The platinum black electrode was connected to a Type SI1260 solartron-impedanc/gain-phase analyzer. An AC current was then allowed to flow through the comparative proton conductive membrane with its frequency being shifted from high frequency to low frequency while reducing the frequency of the current. This resistivity was plotted on the real number axis and the imaginary number axis (Cole-Cole plot). In general, the graph thus plotted forms a semicircle at high frequency side but a rightward-increasing straight line at low frequency side. The diameter of the semicircle represents the resistivity of the sample. In the present measurement process, the radius of the semicircle was estimated. From the estimated value was then calculated the electrical conductivity of the regenerated Nafion membrane-H type.

In accordance with this measurement, the resistivity of the membrane was determined. The distance at which electric current flows through the membrane is 0.5 cm from the standpoint of the structure of the cell. Accordingly, the electrical conductivity of the membrane is determined by the following equation (1):

$$X=D/(S\times R) \quad (1)$$

wherein X represents the protonic conductivity (W$^{-1}$·cm$^{-1}$) of the membrane; D represents the distance between the electrodes (cm) which is 0.5 cm in this case; S represents the sectional area (cm$^2$) of the membrane which is calculated by the product of the width of the membrane (1.0 cm) and the thickness of the membrane (cm); and R represents the resistivity (W) of the membrane.

The protonic conductivity of the comparative proton conductive membrane determined by the foregoing equation (1) was defined to be S0. The protonic conductivity of the proton conductive membrane of Example 1 similarly determined was defined to be S1. From (S1/S0) ratio was then calculated the protonic conductivity relative ratio. The results are set forth in Table 1 below.

<Measurement of Oxidative Degradation Resistance>

10 mg of the proton conductive membrane of Comparative Example 1 was sampled. Using a TG-DTA device, the sample was measured for oxidative degradation temperature in the air at a temperature rising rate of 10° C./min. The oxidative degradation temperature thus determined was defined to be T0 (° C.). The proton conductive membrane of Example 1 was measured for oxidative degradation temperature in the same manner as mentioned above. The oxidative degradation temperature thus determined was defined to be T1. From (T1/T0) ratio was calculated the thermal decomposition resistance ratio. The results are set forth in Table 1 below.

<Measurement of Oxidative Degradation Resistance>

A 100 ml beaker was fixed in an oil bath. An oxidative aqueous solution composed of 3 wt % of aqueous hydrogen peroxide and 40 ppm of FeSO$_4$ was then put in the beaker. The temperature of the oil was adjusted to 60° C. The comparative proton conductive membrane was cut into 3.0 g. The weight of the sample was then measured for weight as W0. The cut membrane sample was put in the aforementioned oxidative aqueous solution which was then allowed to stand for 10 hours. Thereafter, the sample was withdrawn, washed with water, air-dried, and then vacuum-dried. The weight of the sample was then measured as W1. From the difference between W0 and W1 (W0-W1) was then calculated the weight loss WF. The weight loss of the polymer electrolyte membrane of Example 1 was similarly calculated as WC. From (WF/WC) ratio was then calculated the oxidative degradation resistance ratio of Example 1. As a result, it was made obvious that the oxidative degradation resistance ratio (WF/WC) was greater than 1, demonstrating that the oxidatively degradation resistance of the electrolyte membrane of Example 1 was greater than that of the comparative fluorine-based membrane.

Example 2

A proton conductive membrane was prepared in the same manner as in Example 1 except that as the repeating structural unit there was used 3,3,3',3'-tetraethyl-1,1'-spirobisindane-6,6'-diol-9-fluorenonesulflonic acid. The proton conductive membrane thus prepared was then evaluated for membrane properties in the same manner as in Example 1. The results are set forth in Table 1 below. The structure of the repeating unit of the proton conductive membrane of Example 2 is represented by formula (4):

Formula (4)

Example 3

A proton conductive membrane was prepared in the same manner as in Example 1 except that as the repeating structural unit there was used 3,3,3',3'-tetrapropyl-1,1'-spirobisindane-6,6'-diol-9-fluorenonesulflonic acid. The proton conductive membrane thus prepared was then evaluated for membrane properties in the same manner as in Example 1. The results are set forth in Table 1 below. The structure of the repeating unit of the proton conductive membrane of Example 3 is represented by fomula (5):

Formula (5)

Example 4

A proton conductive membrane was prepared in the same manner as in Example 1 except that as the repeating structural unit there was used 3,3,3',3'-tetra(methylethylether)1,1'-spirobisindane-6,6'-diol-9-fluorenonesulflonic acid. The proton conductive membrane thus prepared was then evaluated for membrane properties in the same manner as in Example 1. The results are set forth in Table 1 below. The structure of the repeating unit of the proton conductive membrane of Example 4 is represented by formula (6)

Formula (6)

Example 5

A proton conductive membrane was prepared in the same manner as in Example 1 except that as the repeating structural unit there was used 3,3,3',3'-tetracarboxyl-1,1'-spirobisindane-6,6'-diol-9-fluorenonesulflonic acid. The proton conductive membrane thus prepared was then evaluated for membrane properties in the same manner as in Example 1. The results are set forth in Table 1 below. The structure of the repeating unit of the proton conductive membrane of Example 5 is represented by formula (7):

Formula (7)

Table 2 shows the number P, Q and M of polymerization of the repeating units of Examples 1 to 5.

TABLE 1

| | Methanol crossover inhibition ratio | Protonic conductivity relative ratio | Relative value of oxidative degradation resistance | Thermal decomposition resistance relative ratio |
|---|---|---|---|---|
| Example 1 | 1.1 | 1.2 | 1.3 | 1.1 |
| Example 2 | 1.2 | 1.1 | 1.2 | 1.2 |
| Example 3 | 1.3 | 1.2 | 1.2 | 1.3 |
| Example 4 | 1.1 | 1.2 | 1.2 | 1.1 |
| Example 5 | 1.3 | 1.3 | 1.1 | 1.1 |
| Comparative Example | 1 | 1 | 1 | 1 |

TABLE 2

| | Number P of polymerization | Number Q of polymerization | Number M of polymerization |
|---|---|---|---|
| Example 1 | 60 | 80 | 120 |
| Example 2 | 90 | 100 | 550 |
| Example 3 | 100 | 120 | 4,000 |
| Example 4 | 140 | 140 | 13,000 |
| Example 5 | 180 | 190 | 28,000 |

As can be seen in Table 1, the non-fluorine-based proton conductive membranes of Examples 1 to 5 are excellent in methanol crossover inhibiting effect, protonic conductivity, oxidative degradation resistance and thermal decomposition resistance as compared with the comparative fluorine-based proton conductive membrane.

Subsequently, the proton conductive membranes of Examples 1 to 5 and the comparative proton conductive membrane were each used to prepare direct methanol type fuel cells which were then evaluated for current-voltage characteristics.

<Assembly of Single Cell>

Platinum-ruthenium was supported on a carrier made of carbon powder to prepare an anode catalyst. A slurry containing the anode catalyst was then spread over a carbon paper to form an anode catalyst layer thereon (amount of platinum-ruthenium supported on anode side: 2 mg/cm$^2$).

Separately, platinum was supported on a carrier made of carbon powder to prepare a cathode catalyst. A slurry containing the cathode catalyst was then spread over a carbon paper to form a cathode catalyst layer thereon (amount of platinum supported on cathode: 1 mg/cm$^2$).

The anode catalyst layer was provided on one side of each of the proton conductive membranes of Examples 1 to 5 and the comparative proton conductive membrane. The cathode catalyst layer was provided on the other side of each of these proton conductive membranes. These layers were then subjected to hot contact bonding to prepare a membrane-electrode assembly (MEA) having an electrode area of 5 cm$^2$.

The membrane-electrode thus obtained was each disposed between two sheets of carbon separator having a serpentine channel. The laminates were each further disposed between two sheets of collector. The laminates were each bolted to prepare a single cell to be evaluated.

<Evaluation of Single Cell>

Figure 2:
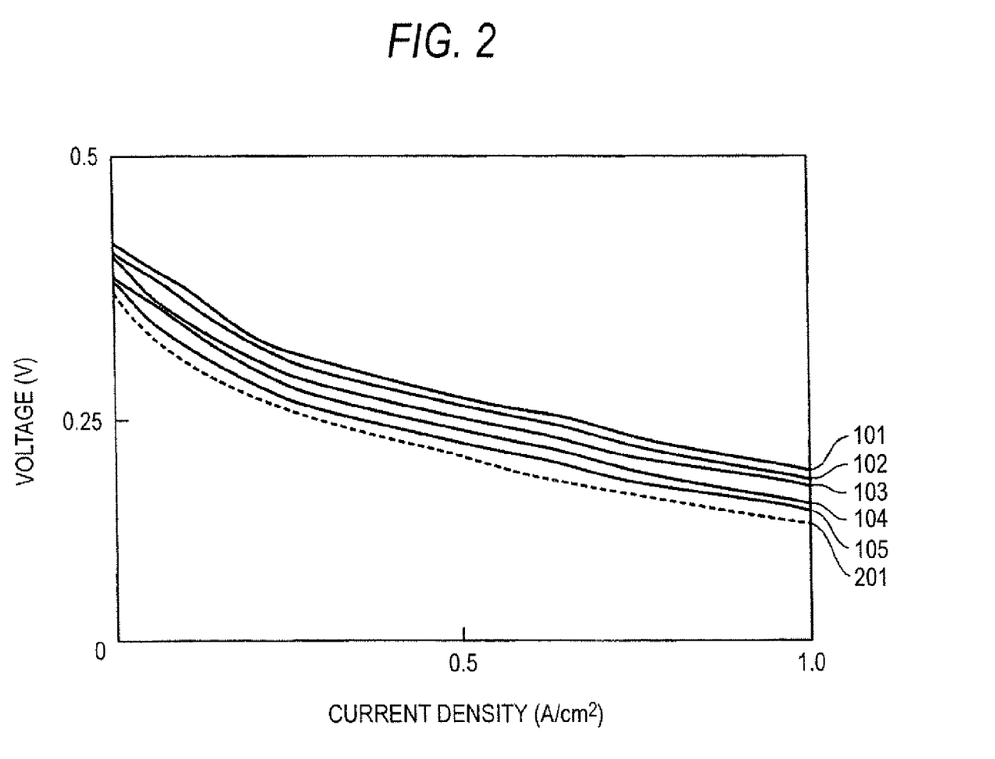
FIG. 2 is an exemplary characteristic curve illustrating the current-voltage characteristics of the direct methanol type fuel cells of Examples 1 to 5 and Comparative Example.

The single cell thus prepared was mounted on a device for evaluating direct methanol type fuel cell. A 3 wt % aqueous solution of methanol was supplied into the single cell on the anode side thereof at a flow rate of 2.5 ml/min. Air was supplied into the single cell on the cathode side thereof at a flow rate of 20 ml/min. Under these conditions, the single cell was then observed for current-voltage curve at a cell temperature of 75° C. The results are shown in FIG. 2. The results are shown in FIG. 2. Lines 101 to 105 represent the results of Examples 1 to 5, respectively, and line 201 represents the result of Comparative Example.

As can be seen in FIG. 2, the fuel cells comprising the proton conductive membranes having chemical structures of Examples 1 to 5 show better current-voltage characteristics than the comparative fuel cell. It is thus made obvious that the invention exerts an effect of enhancing the output of direct methanol type fuel cell.

The invention is not limited to the aforementioned embodiments. In the implementation of the invention, the constitutions may be changed without departing from the spirit of the invention. Further, various inventions may be worked out by properly combining a plurality of constitutions disclosed in the aforementioned embodiments. For example, some of all the constitutions disclosed in the embodiments may be deleted. Moreover, constitutions selected from different embodiments may be properly combined.

What is claimed is:

1. A proton conductive polymer comprising:
an aromatic steric compound unit;
a proton conductive compound unit; and
a repeating unit represented by formula (2):

Formula (2)

wherein $R^1$, $R^2$, $R^3$ and $R^4$ each independently represents a substituent having from 1 to 10 carbon atom(s), and $R^1$, $R^2$, $R^3$ and $R^4$ are the same or different; and
P, Q and M each independently represents a positive integer.

2. The proton conductive polymer according to claim 1, wherein the aromatic steric compound unit comprises a spiro structure as a basic skeleton.

3. The proton conductive polymer according to claim 1, wherein the proton conductive compound unit comprises an aromatic compound having a proton conductive functional group.

4. The proton conductive polymer according to claim 3, wherein the proton conductive functional group is a sulfonic acid group.

5. The proton conductive polymer according to claim 1, wherein the repeating unit is structured as represented by formula (1):

Formula (1)

wherein X represents the aromatic steric compound unit;
Y represents the proton conductive compound unit;
P represents an integer from 1 to 200;
Q represents an integer from 1 to 200; and
M represents an integer from 80 to 30,000.

6. The proton conductive polymer according to claim 5, wherein P is an integer from 20 to 120;
Q is an integer from 20 to 120; and
M is an integer from 3,000 to 25,000.

7. The proton conductive polymer according to claim 1, wherein P is an integer of from 1 to 200;
Q is an integer from 1 to 200; and
M is an integer from 80 to 30,000.

8. The proton conductive polymer according to claim 1, wherein P is an integer of from 20 to 120;
Q is an integer from 20 to 120; and
M is an integer from 3,000 to 25,000.

9. The proton conductive polymer according to claim 1, wherein $R^1$, $R^2$, $R^3$ and $R^4$ each independently represents a hydrocarbon group having from 1 to 10 carbon atom(s), a carboxyl group or an ether group having from 1 to 10 carbon atom(s), and $R^1$, $R^2$, $R^3$ and $R^4$ are the same or different.

10. A fuel cell comprising:
an anode;
a cathode; and
a proton conductive membrane between the anode and the cathode,
wherein the proton conductive membrane comprises a polymer containing an aromatic steric compound unit and a proton conductive compound unit, the polymer comprises a repeating unit represented by formula (2):

Formula (2)

wherein R1, R2, R3 and R4 each independently represents a substituent having from 1 to 10 carbon atom(s), and R1, R2, R3 and R4 are the same or different; and P, Q and M each independently represents a positive integer.

11. The fuel cell according to claim 10, further comprising a liquid fuel containing methanol to be supplied into the anode.

12. The fuel cell according to claim 11, wherein the liquid fuel is an aqueous solution of methanol.

13. The fuel cell according to claim 10, wherein the aromatic steric compound unit comprises a spiro structure as a basic skeleton.

14. The fuel cell according to claim 10, wherein the proton conductive compound unit comprises an aromatic compound having a proton conductive functional group.

15. The fuel cell according to claim 14, wherein the proton conductive functional group is a sulfonic acid group.

16. The fuel cell according to claim 10, wherein the repeating unit of the polymer is structured as represented by (1):

Formula (1)

wherein X represents the aromatic steric compound unit;
Y represents the proton conductive compound unit;
P represents an integer from 1 to 200;
Q represents an integer from 1 to 200; and
M represents an integer from 80 to 30,000.

17. The fuel cell according to claim 16, wherein P is an integer from 20 to 120;
Q is an integer from 20 to 120; and
M is an integer from 3,000 to 25,000.

* * * * *